March 22, 1966  E. B. PINKERTON  3,241,896
BEARING FOR A RECIPROCATING MACHINE AND METHOD
FOR ASSEMBLING IT
Filed Sept. 30, 1964  6 Sheets-Sheet 3

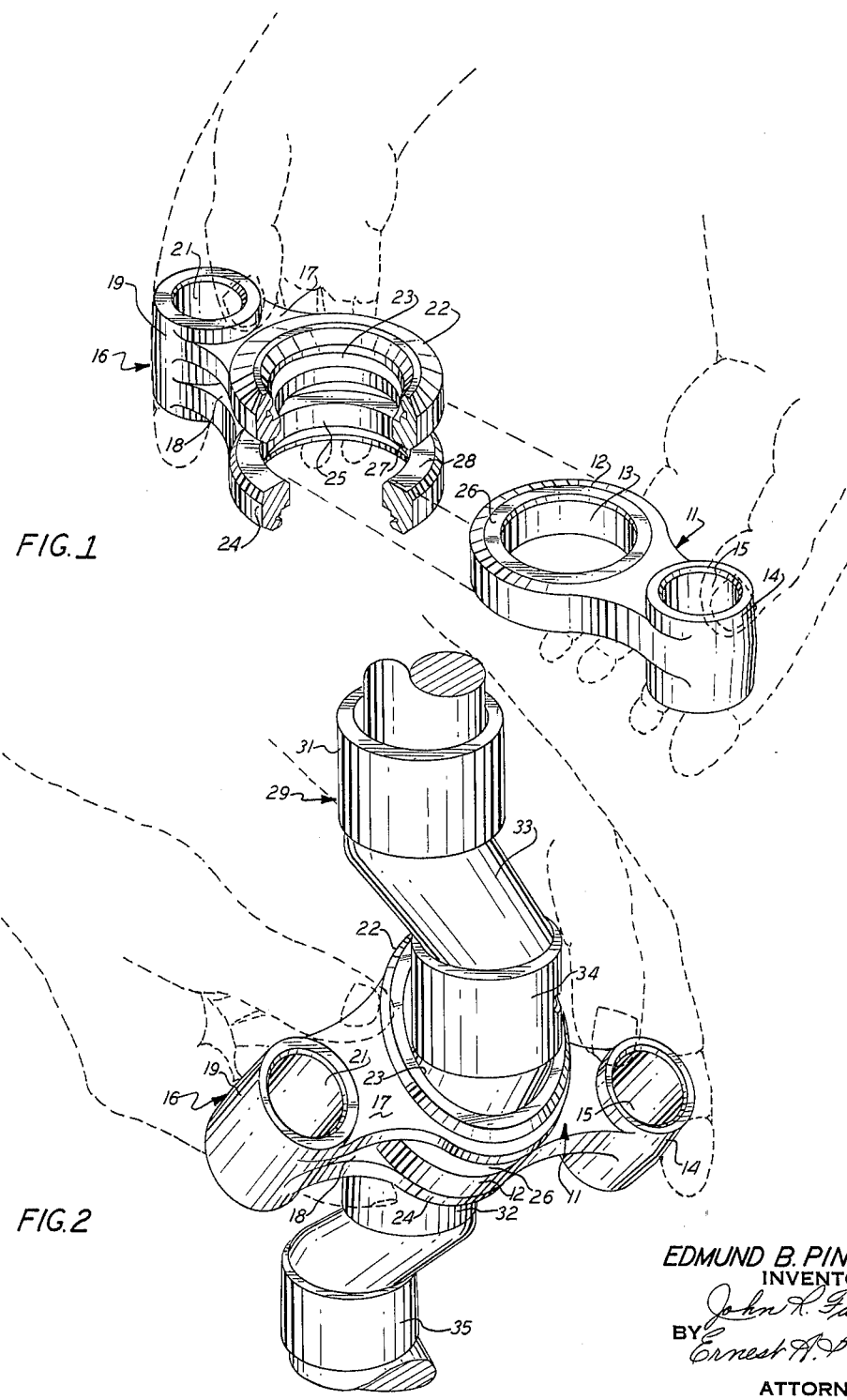

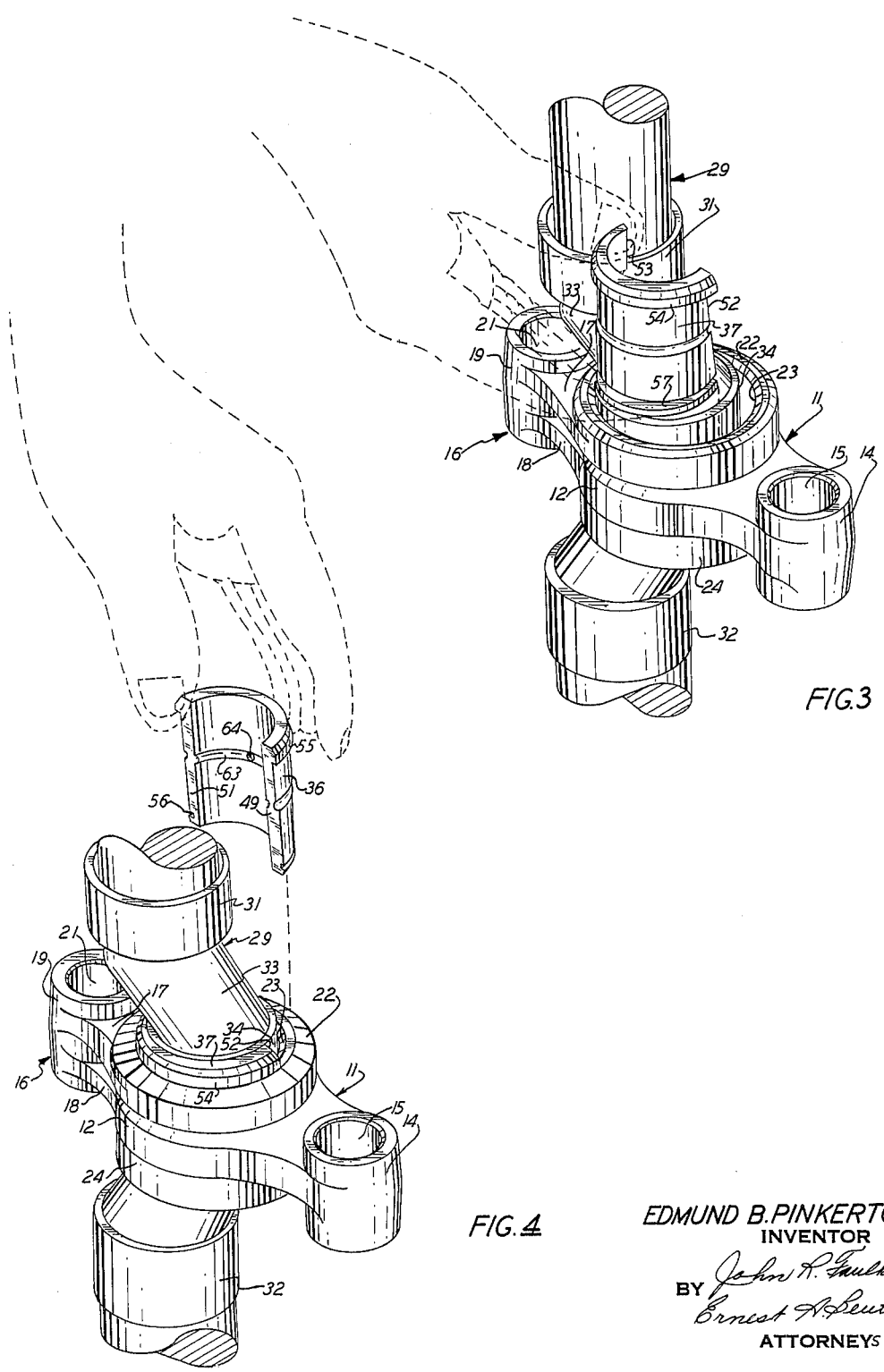

EDMUND B. PINKERTON
INVENTOR

BY John R. Faulkner
Ernest H. Reutler
ATTORNEYS

March 22, 1966  E. B. PINKERTON  3,241,896
BEARING FOR A RECIPROCATING MACHINE AND METHOD
FOR ASSEMBLING IT
Filed Sept. 30, 1964  6 Sheets-Sheet 4

EDMUND B. PINKERTON
INVENTOR
BY John A. Faulkner
Ernest A. Beutler
ATTORNEYS

EDMUND B. PINKERTON
INVENTOR

March 22, 1966  E. B. PINKERTON  3,241,896
BEARING FOR A RECIPROCATING MACHINE AND METHOD
FOR ASSEMBLING IT
Filed Sept. 30, 1964  6 Sheets-Sheet 6

EDMUND B. PINKERTON
INVENTOR
BY John A. Faulkner
Ernest A. Beutler
ATTORNEYS

United States Patent Office 3,241,896
Patented Mar. 22, 1966

3,241,896
BEARING FOR A RECIPROCATING MACHINE
AND METHOD FOR ASSEMBLING IT
Edmund B. Pinkerton, Livonia, Mich., assignor to Ford
Motor Company, Dearborn, Mich., a corporation of
Delaware
Filed Sept. 30, 1964, Ser. No. 400,317
7 Claims. (Cl. 308—237)

This application is a continuation-in-part of my copending application entitled "Bearing" Serial No. 91,684, filed February 27, 1961, now abandoned.

This invention relates to a bearing and method for assembling it and more particularly to a bearing for a reciprocating machine and method for assembling it.

This application also is related to the patent application entitled "Reciprocating Machine And A Method For Assembling It" in which I am a co-inventor with Robert P. Ernest, which application has Serial No. 400,429 and was filed September 30, 1964.

It is a common practice to position replaceable, plain bearing segments between opposing surfaces of members that are supported for relative rotation. It also is well known to force or press fit the plain bearing segments into a surface of the outer member so that the plain bearing segments will experience relative rotation only along one of their surfaces. This type of bearing construction is commonly used in reciprocating machines such as piston pumps or internal combustion engines. In one application of this type, the plain bearing segments are positioned between the connecting rod journal of a crankshaft and the corresponding crankshaft journal of a connecting rod.

There is a distinct disadvantage to this type of bearing arrangement, particularly when it is used in reciprocating machines. In order to obtain the press fit of the bearing segments within the outer member, it has heretofore been necessary to split the outer member. The outer perimeter of the bearing segments are formed with a greater dimension than the circumference of the journal of the outer member so that when the split halves of the outer member are assembled the bearing segments become press fitted within it. Splitting of the outer member requires the provision of some fastening means to reassemble it. It also is expensive to maintain close tolerances upon the split outer surface, and it is difficult to machine this surface.

The use of a bearing arrangement wherein the outer member is split is also disadvantageous in high speed reciprocating machines like internal combustion engines. When a connecting rod is split, some means must be provided to secure the connecting rod halves together. Besides adding to the cost of the assembly, these fastening means require the provision of additional material to the connecting rod to reduce unit stresses in a resulting high stress concentration area. The additional material not only adds weight to the connecting rod but also requires additional counter balancing weights on the crankshaft to compensate for the heavier reciprocating mass. Larger bearings also must be used. The cost disadvantage of the split connecting rod, therefore, is magnified by the necessity of providing additional material to other components. The larger components also add to the special requirements of the parts.

It, therefore, is the principal object of this invention to provide a structure and a method for assembling plain bearing segments within inner and outer members with a force fit without necessitating splitting of one of the members.

It is a further object of this invention to provide a bearing arrangement and method for its assembly that particularly lends itself to the use of a unitary connecting rod in a reciprocating machine.

A bearing construction embodying this invention comprises an inner member having a cylindrical outer surface. An outer member having a cylindrical inner surface formed by a bore extending therethrough is supported for rotation relative to the inner member. The members are supported with their cylindrical surfaces in coaxial disposition and in facing relationship to each other. The bore of the outer member has a greater diameter than the cylindrical outer surface of the inner member to form an annular gap therebetween. At least two plain bearing segments are inserted into the annular gap. The plain bearing segments have pairs of adjacent edges in abutting relationship. At least one of the pairs of edges lies in a plane that is angularly disposed to the axis of the cylindrical surfaces to result in a force fit of the segments into the cylindrical inner surface.

The bearing construction described in the preceding paragraph lends itself particularly well to use as a connecting rod bearing for a reciprocating machine. In such an application, the inner member comprises the crankshaft and the outer member comprises the connecting rod. The connecting rod may be unitary and as such will be provided with a bore that forms a crankshaft journal which is sufficiently large to permit the connecting rod to be threaded axially along the crankshaft to a position in alignment with a connecting rod journal of the crankshaft.

The method by which a bearing embodying this invention may be assembled comprises the steps of positioning an inner member having a cylindrical outer surface in axial alignment with an outer member having a cylindrical inner surface in axial alignment with the cylindrical surfaces in facing relationship. A first plain bearing segment having at least one edge disposed at an angle to the axis of the surfaces is inserted between the surfaces. A second plain bearing segment having an edge complementary to the edge of the first plain bearing segment is then forced between the surfaces for creating a press fit between the plain bearing segments and the outer member.

Further objects and advantages of this invention will become more apparent as this description proceeds, particularly when considered in conjunction with the accompanying drawings, wherein:

FIGURES 1–8 are perspective views showing the various steps of assembling a reciprocating machine embodying this machine.

Figure 5:
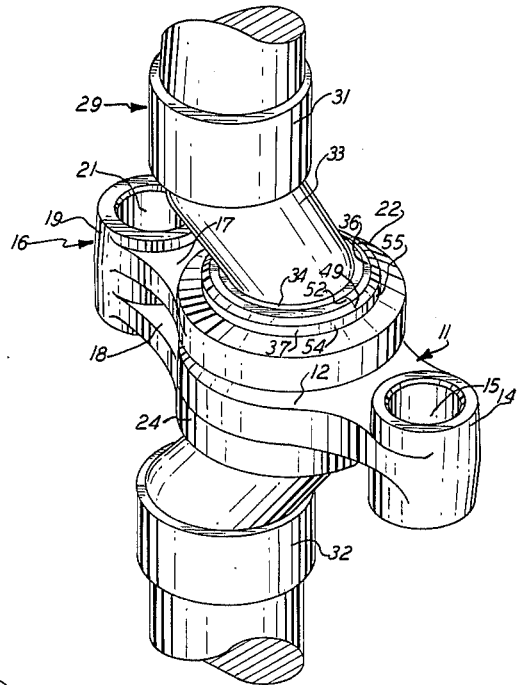

Referring now in detail to the drawings and in particular to FIGURE 1, a unitary, plain connecting rod is indicated by the reference numeral 11. The plain connecting rod 11 has an integral crankshaft journal end 12 with an enlarged crankshaft journal 13 formed by a bore that extends through the end 12 to form a cylindrical inner surface. A piston pin end 14 of the plain connecting rod 11 is formed with a piston pin journal 15.

A unitary, forked connecting rod is indicated generally by the reference numeral 16. The forked connecting rod 16 has a pair of axially spaced blades 17 and 18 that are integrally connected to a piston pin end 19 formed with a piston pin journal 21. The blade 17 terminates in a crankshaft journal end 22 in which a crankshaft journal 23 is formed. The blade 18 terminates in a crankshaft journal end 24 that is formed with a crankshaft journal 25. The crankshaft journals 23 and 25 are cylindrical inner surfaces that are formed by bores in the blades 17 and 18.

It is preferred to have the crankshaft journals of the connecting rods 16 and 11 of slightly different diameters so that the plain bearing segments, which will be described as this description proceeds, may be press fitted into the journal of only one of the connecting rods. In the illustrated embodiment, the crankshaft journals 23 and 25 of the forked connecting rod 16 are of the same diameter and are of a lesser diameter than the diameter of the crankshaft journal 13 of the plain connecting rod 11.

The first step of assembling the disclosed machine, which is an opposed cylinder internal combustion engine, comprises inserting the crankshaft journal end 12 of the plain connecting rod 11 between the crankshaft journal ends 22 and 24 of the blades 17 and 18 of the forked connecting rod 16. Opposed machined surfaces 26 of the plain connecting rod are contacted by opposed machined surfaces 27 and 28 of the crankshaft journal ends 22 and 24 of the forked rod 16. The contact between the machined surfaces 26, 27 and 28 prevents relative axial movement between the connecting rod assembly formed by the plain connecting rod 11 and the forked connecting rod 16. When the connecting rod assembly is completed, the crankshaft journals 13, 23 and 25 are axially aligned.

Referring now to FIGURE 2, the engine also includes a multiple throw crankshaft, indicated generally by the reference numeral 29. The crankshaft 29 has one throw for each pair of cylinders. That is, if an eight cylinder engine is to be used, the crankshaft will have four throws. The depicted engine is of four cylinder variety so that two throws are provided. Describing the crankshaft now in detail, it is provided with at least two longitudinally spaced, coaxial main bearing portions 31 and 32. A throw 33 forming a connecting rod journal 34 is positioned between the main bearing portions 31 and 32. A similar throw and connecting rod journal, indicated generally at 35, is axially spaced from the throw 33.

The diameters of the crankshaft journals 13, 23 and 25 of the connecting rods 11 and 16 are made sufficiently large to permit the connecting rod assembly, which has previously been completed, to be threaded axially along the crankshaft 29 (FIGURE 2) without necessitating splitting of the individual connecting rods. The connecting rod assembly is threaded along the crankshaft 29 to a position in axial alignment with the connecting rod journal 34 of the throw 33. It is to be understood that a similar connecting rod assembly also is threaded into axial alignment with the throw and journal 35 in the same manner.

Referring now to FIGURE 3, when the connecting rod assembly is axially aligned with the connecting rod journal 34 a gap exists between the external surface of the journal 34 and the crankshaft journals 13, 23 and 25. This gap is a result of the enlarged diameter of the journals 13, 23 and 25 that permits the threading of the connecting rod assembly onto the crankshaft.

A first plain bearing segment, indicated by the reference numeral 37, is inserted into the gap between the journals. After the bearing segment 37 is in place between the journals (FIGURE 4), a second plain bearing segment, indicated generally by the reference numeral 36, is forced into the space between the journals. The construction of the plain bearing segments 36 and 37 is such that they will have a force fit within the journals 23 and 25 of the forked connecting rod 16 when they are so inserted. The structure for accomplishing this result will become apparent as this description proceeds.

Figure 6:
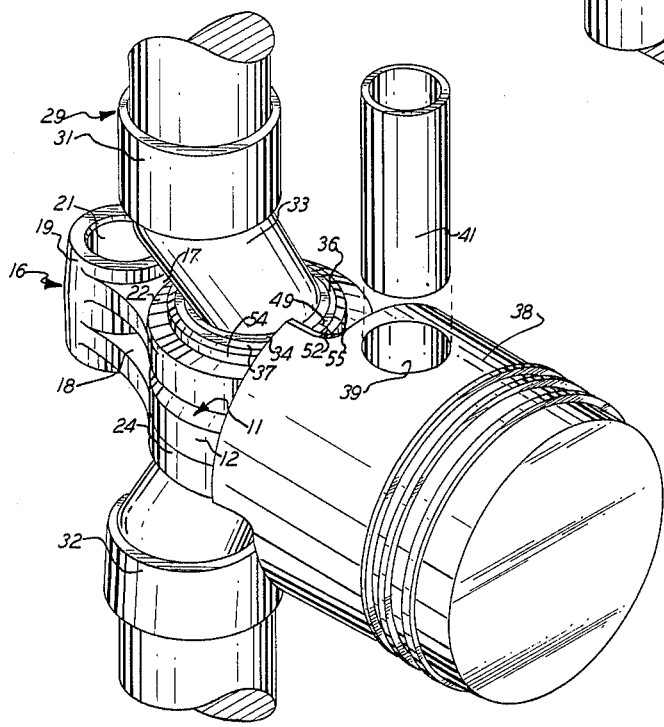

After the bearing segments 36 and 37 are interposed between the connecting rods 11 and 16 and the crankshaft 29, a piston, indicated generally by the reference numeral 38, is fitted onto the connecting rod 11 (FIGURE 6). The piston 38 is provided with a bore 39 that is substantially the same diameter as the piston pin bore 15 of the connecting rod 11. A piston pin 41 is fitted into the bores 39 and 15 to journal the piston 38 upon the connecting rod 11. The piston 38 coacts with the connecting rod 11 to axially locate the connecting rod assembly on the crankshaft 29 as is described and claimed in the co-pending patent application entitled "Reciprocating Machine and a Method for Assembling It," Serial No. 400,429, filed September 1964, in which I am a co-inventor with Robert P. Ernest.

It is to be understood that a piston is fitted to the forked connecting rod 16 in the same manner. Pistons also are journaled upon each of the individual connecting rods of the other connecting rod assembly. Piston rings may then be inserted onto each piston if desired.

Figure 7:
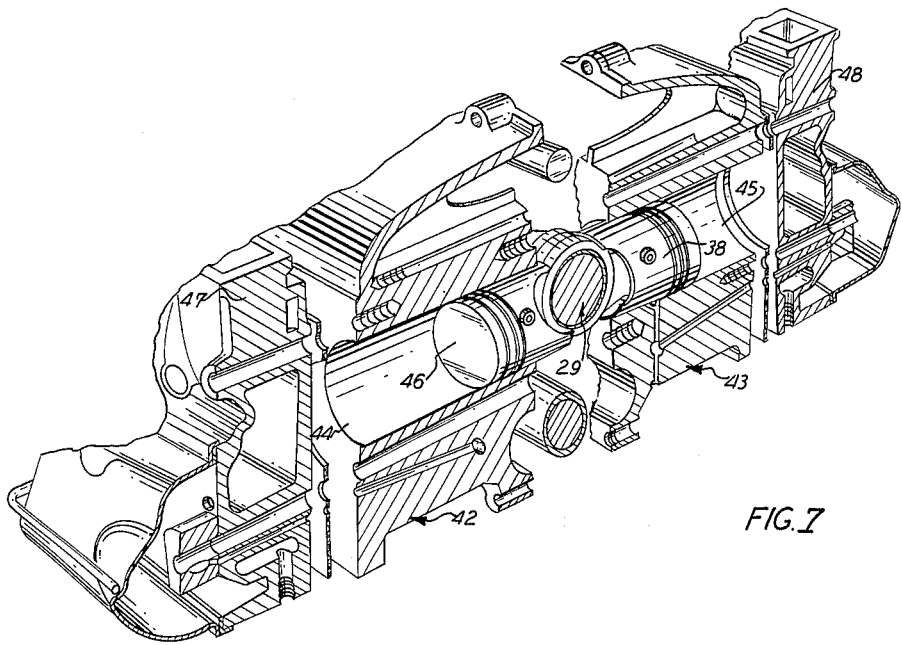
Figure 8:
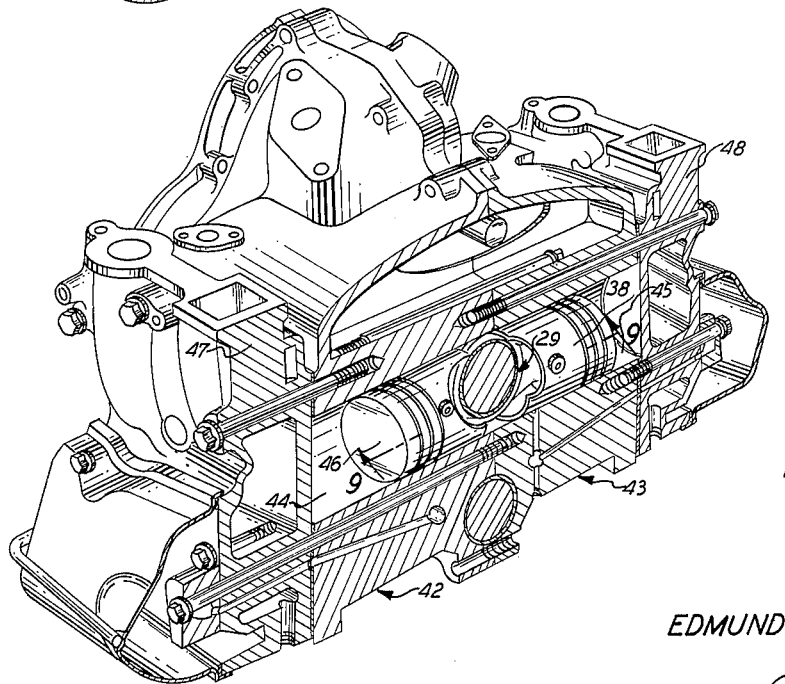

When all of the pistons are assembled onto the respective connecting rods, they are positioned on opposite sides of a plane containing the axis of the crankshaft 29 and each piston is slid into the cylinder bore of a cylinder block (FIGURE 7). In the illustrated engine, horizontally disposed cylinder blocks, indicated generally by the reference numerals 42 and 43, are provided. Each of the cylinder blocks 42 and 43 has one or more cylinder bores 44 and 45, respectively, for receipt of the piston 38, which has been described, and a piston 46 that is connected to the forked connecting rod 16.

Since the engine is the opposed cylinder type, the cylinder blocks 42 and 43 are drawn toward each other from opposite horizontal directions. The bearings (not shown) for the crankshaft main bearing journals 31 and 32 also are inserted at this time in any suitable manner. When the cylinder blocks 42 and 43 are in place, cylinder heads 47 and 48 may be assembled to the cylinder blocks. Other components of the engine are then added and the engine may be bolted together by means of the bolting arrangement illustrated and described in Patent No. 3,059,623, issued October 23, 1962, and entitled "Bolting Arrangement For Reciprocating Machinery."

The structure which permits the plain bearing segments 36 and 37 to be press fitted into crankshaft journals 23 and 25 of the forked connecting rod 15 when it is axially aligned with the crankshaft 29 will now be described by particular reference to FIGURES 3–5, 9 and 10. The plain bearing segment 36 has a pair of edges 49 and 51 that are abutted by complementary edges 52 and 53, respectively, of the bearing segment 37 when the bearing segments 36 and 37 are assembled. The edges 49, 51, 52 and 53 all lie in a common plane that is angularly disposed with respect to and intersects the axis of the journals 34, 23, 25 and 13. When the edges 49, 52 and 51, 53 are positioned in abutting relationship with the bearings removed from the the engine (FIGURE 10), the outer perimeter of the bearing segments 36 and 37 is greater than the circumference of the journals 23 and 25 of the forked connecting rod 16.

The bearing segment 37 is inserted into the annular gap between the journals first (FIGURE 3). A shoulder 54 is formed at the outer end of the bearing segment 37 to limit the depth of insertion. It will be noted that the perimeter of the inner end of the bearing segment 37 is greater than the perimeter at the shoulder 54 because of the angular disposition of the edges 52, 53.

When the segment 37 is in place and the bearing segment 36 is inserted (FIGURE 5), it must be forced into the gap because of the difference between the perimeter of the outer surface of the bearing segments 36 and 37 and circumference of the journals 23 and 25. The initial insertion is facilitated by the fact that a gap will exist between the edges 49 and 51 of the bearing segment 36 and the edges 52 and 53 of the bearing segment 37. As the bearing segment 36 is inserted to a greater depth within the gap between the journals, however, the edges 49 and 51 will move into a wedging contact with the edges 52, 53. It is this wedging action that causes the force fit.

The bearing 36 is inserted to a depth until a shoulder 55 formed on its outer end contacts the outer edge of the blade 17 of the forked connecting rod 16. A groove 56 is formed within the bearing segment 36 and a corresponding groove 57 is formed in the bearing segment 37. The grooves 56 and 57 are formed at the ends opposite to the shoulders 54 and 55 and protrude past the blade 18 of the forked connecting rod 16 when the bearing segments are in place. A snap ring 58 is positioned within the grooves 56 and 57 to axially retain bearing segments 36 and 37 within the connecting rod assembly.

If desired, a pin 59 may be inserted through a slot 61 formed in the bearing segment 36 to insure against rotation of the bearing segments 36 and 37 relative to the forked connecting rod 16. It should be apparent that the plain connecting rod 11 may oscillate upon the outer surfaces of the bearing segments 36 and 37 during engine operation because of the larger diameter of its journal 13.

Figure 9:
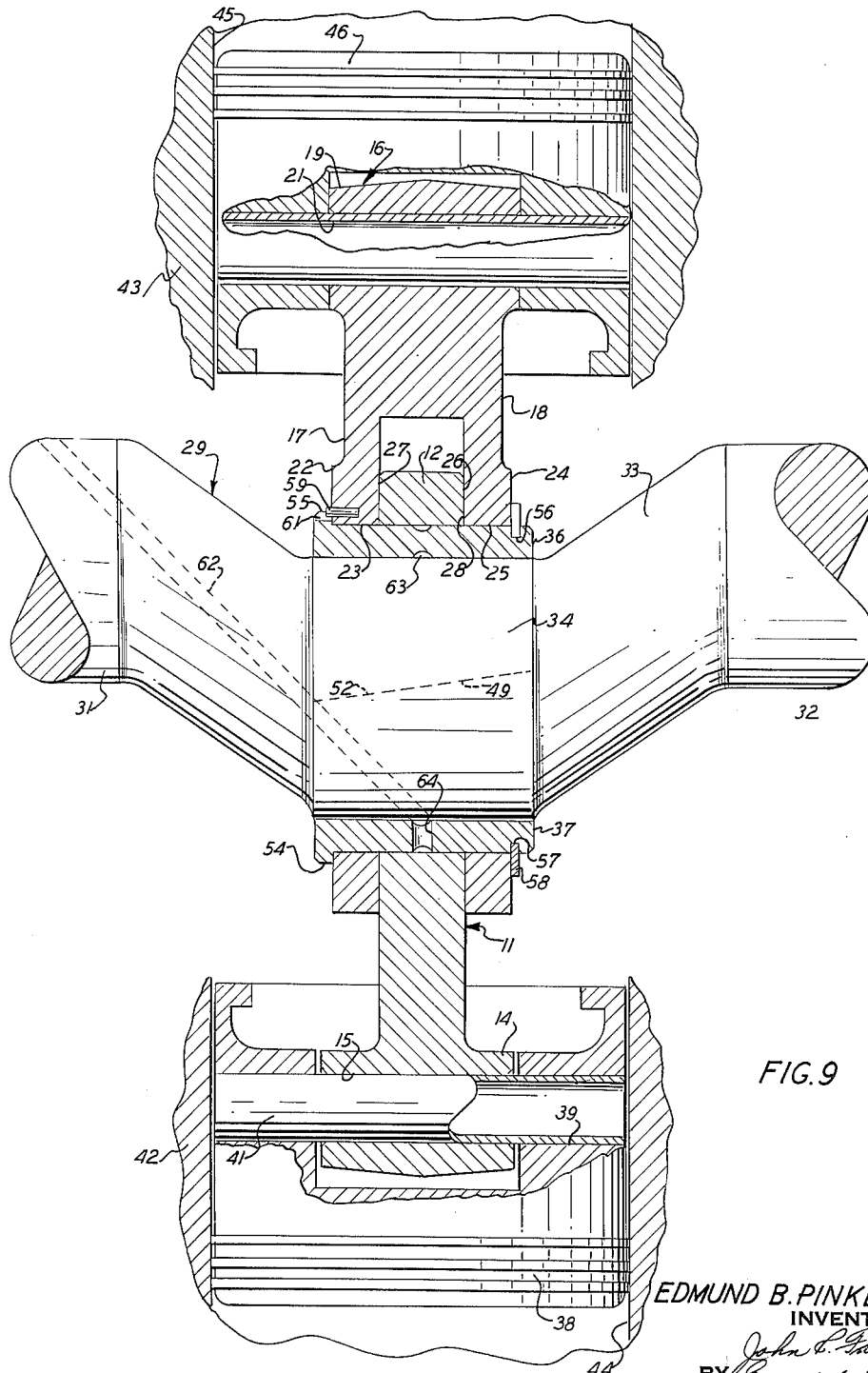
FIGURE 9 is a cross-sectional view taken generally along the line 9—9 of FIGURE 8.
Figure 10:
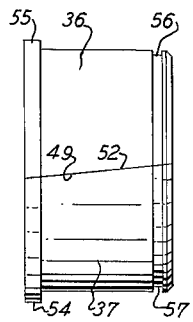
FIGURE 10 is a side elevational view of the bearing assembly embodied in the machine illustrated in the preceding figures.

Referring to FIGURE 9, a transverse oil passage 62 may extend through the crankshaft throw 33 for delivering lubricant under pressure to the bearing surfaces. The outer end of the passage 62 terminates within the connecting rod journal 34 of the crankshaft 29. A groove 63 is formed around the inner surface of the bearing segments 36 and 37 in registry with the passage 62. One or more drilled holes 64 may be provided through one or both of the bearing segments 36 and 37 to permit oil to flow to the outer surfaces of the bearing segments so that the crankshaft journal 13 of the connecting rod 11 may be lubricated as may the abutting surfaces between the connecting rods 11 and 16.

Figure 11:
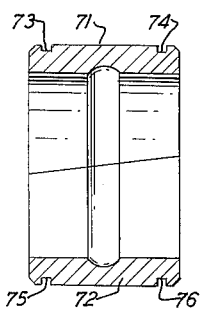
FIGURE 11 is a cross-sectional view of a bearing assembly illustrating another embodiment.

It should be apparent that, because of the provision of the shoulders 54 and 55, the bearing segments 36 and 37 can only be inserted from one side of the connecting rod. Also the bearing segments are dissimilar. FIGURE 11 illustrates a bearing arrangement wherein the bearing segments may be inserted from either side of the connecting rod or from opposite sides if details of the machine make it desirable to so insert the bearing segments. In this embodiment, identical bearing segments 71 and 72 are provided. The segments 71 and 72 are very similar to the bearing segments 36 and 37 which have previously been described in that they have abutting edges that are disposed at an angle to the axis of the journal. They also have a greater external perimeter in the unassembled state than the internal diameter of the member in which they are received.

The bearing segment 71 has circumferential grooves 73 and 74 formed at each end thereof. The bearing segment 72 has corresponding circumferential grooves 75 and 76. By comparing the embodiments shown in FIGURES 10 and 11 it should be readily apparent that the grooves 73 and 75 serve the same purpose as the shoulders 54 and 55 of the embodiment in FIGURE 10. A snap ring may be received in these grooves to axially position the bearing.

Figure 12:
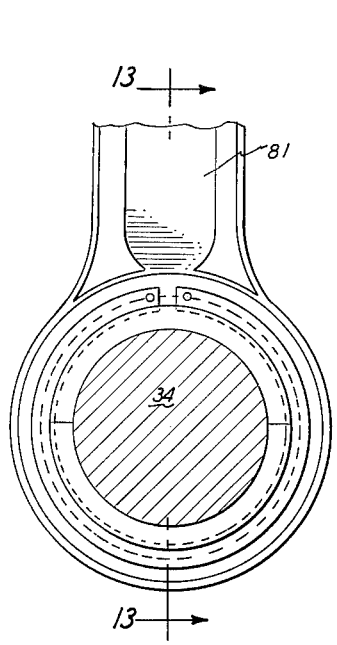
FIGURE 12 is a front plan view of a portion of a reciprocating machine having a plain connecting rod and embodying this invention.
Figure 13:
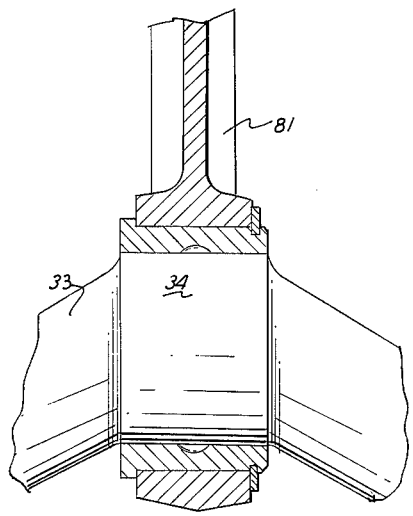
FIGURE 13 is a cross-sectional view taken along the lines 13—13 of FIGURE 12.

In the previously described embodiments the bearing segments and machines in which they are used included a plain and a forked connecting rod. It should be readily apparent that the bearing arrangement described may be used with a plain connecting rod or with any other form of external and internal journals. FIGURES 12 and 13 illustrate the provision of the bearing segments in an engine having a single, plain connecting rod, indicated generally by the reference numeral 81. The remainder of the structure shown in FIGURES 12 and 13 is identical to that previously described and will not be described in detail.

In all of the embodiments described, the bearing is made up of two bearing segments in which all abutting edges lie in a common plane that is angularly disposed to the axis of rotation of the crankshaft. The force fit of the bearing segments within the outer member also could be accomplished if only one pair of abutting edges of the bearing segments were angularly disposed to the axis of rotation. In a like manner, it would be possible to use more than two bearing segments provided there are at least one pair of abutting edges that have angularly disposed edges. Various other changes and modifications than those illustrated and described may be made without departing from the spirit and scope of the invention, as defined by the appended claims.

I claim:

1. A bearing construction comprising an inner member having a cylindrical outer surface, an outer member having a cylindrical inner surface formed by a bore extending therethrough, said outer member being formed from a single piece to provide a continuous inner surface, means supporting said members for relative rotation with said cylindrical surfaces being coaxially disposed and in facing relationship to each other, said bore having a greater diameter than said cylindrical outer surface to form an annular gap therebetween, and at least two plain bearing segments inserted into said annular gap, said plain bearing segments having pairs of adjacent edges in abutting relationship, at least one pair of said edges lying in a plane angularly disposed to the axis of said cylindrical surfaces for force fitting said segments into said cylindrical inner surface, said segments having an annular groove adjacent to one end, and ring means positioned in part in said grooves and engaging a side of the outer member.

2. The bearing construction of claim 1 in which the segments have a flange adjacent to the other end, said flange engaging the other side of the outer member.

3. A reciprocating machine comprising the bearing construction of claim 1 in which the inner member is a crankshaft and the cylindrical outer surface is a connecting rod journal formed on said crankshaft, the outer member is a connecting rod having a bore extending through one end thereof to form a crankshaft journal, said bore being sufficiently large to permit the connecting rod to be threaded axially along said crankshaft into a position with the journals coaxially disposed and in facing relationship.

4. An internal combustion engine comprising a crankshaft having a journal, a connecting rod having a bore at one end, a pair of crankshaft bearing segments in said bore, said segments having pairs of edges in abutting relationship, rendering said segments capable of insertion into said bore while said bore is coaxially disposed about said journal, at least one pair of said edges lying in a plane angularly disposed to the axis of said bore, an annular groove adjacent to one end of the segments, and ring means positioned in part in the grooves and engaging a side of the rod.

5. The engine of claim 4 in which the segments have a flange adjacent to the other end, said flange engaging the other side of the rod.

6. An internal combustion engine comprising a connecting rod having a forked end provided with concentric bores, a plain connecting rod having an end provided with a bore, said plain connecting rod end being disposed in the forked end with said first and second mentioned bores being concentric, a pair of bearing segments secured in the first mentioned bores and extending through said second mentioned bore, said segments having pairs of edges in abutting relationship, at least one pair of said edges lying in a plane angularly disposed to the axis of said bores, each of said bearing segments having an annular groove adjacent to one end of the segments, and ring means positioned in part in the grooves and engaging a side of the forked end.

7. The engine of claim 6 in which the segments have a flange adjacent to the other end, said flange engaging the other side of the forked end.

References Cited by the Examiner

UNITED STATES PATENTS

| | | | |
|---|---|---|---|
| 374,833 | 12/1887 | Hill | 308—237 |
| 648,204 | 4/1900 | Harris | 308—237 |
| 1,293,792 | 2/1919 | Jimerson | 308—237 |
| 1,804,038 | 5/1931 | Tandy | 74—580 |
| 1,971,433 | 8/1934 | Tartrais | 308—237 |
| 2,695,204 | 11/1954 | Matera | 308—197 |

FOREIGN PATENTS

| | | |
|---|---|---|
| 938,371 | 4/1948 | France. |
| 196,710 | 5/1923 | Great Britain. |

DON A. WAITE, *Primary Examiner.*

FRANK SUSKO, *Examiner.*